United States Patent
Wang et al.

(10) Patent No.: US 11,166,219 B2
(45) Date of Patent: Nov. 2, 2021

(54) ENABLING RELAYED COMMUNICATION IN A WIRELESS COMMUNICATION SYSTEM

(71) Applicant: Telefonaktiebolaget LM Ericsson (publ), Stockholm (SE)

(72) Inventors: Yu Wang, Solna (SE); Dennis Sundman, Sollentuna (SE); Jingcheng Zhang, Svärtinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 17 days.

(21) Appl. No.: 16/334,912

(22) PCT Filed: Oct. 21, 2016

(86) PCT No.: PCT/SE2016/051030
§ 371 (c)(1),
(2) Date: Mar. 20, 2019

(87) PCT Pub. No.: WO2018/074959
PCT Pub. Date: Apr. 26, 2018

(65) Prior Publication Data
US 2019/0289527 A1  Sep. 19, 2019

(51) Int. Cl.
*H04W 40/22* (2009.01)
*H04W 72/04* (2009.01)
(Continued)

(52) U.S. Cl.
CPC ....... *H04W 40/22* (2013.01); *H04W 72/0446* (2013.01); *H04W 72/1289* (2013.01); *H04W 88/04* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 5,345,594 A * | 9/1994 | Tsuda | H04B 7/18523 455/13.1 |
| 2007/0150928 A1* | 6/2007 | Hottinen | H04B 7/155 725/127 |

(Continued)

FOREIGN PATENT DOCUMENTS

| WO | WO 2013/010010 A1 | 7/2013 |
|---|---|---|
| WO | WO 2014/051373 A1 | 4/2014 |
| WO | WO 2014/138523 A1 | 9/2014 |

OTHER PUBLICATIONS

International Search Report and Written Opinion of the International Searching Authority, PCT/SE2016/051030, dated Jul. 18, 2017, 12 pages.

(Continued)

*Primary Examiner* — Shripal K Khajuria
(74) *Attorney, Agent, or Firm* — Sage Patent Group

(57) ABSTRACT

According to an aspect of the proposed technology, there is provided a method performed by a network device for enabling relayed communication in at least one direction between a first communication unit and a second communication unit in a wireless communication system. The method comprises the steps of the network device specifying a relay unit for the relayed communication, and the network device determining information for scheduling and/or configuring a first transmission of a data frame from the second communication unit to the specified relay unit and a second transmission of the data frame from the specified relay unit to the first communication unit, and the network device generating a trigger frame including the information for scheduling and/or configuring the first transmission and the second transmission.

18 Claims, 17 Drawing Sheets

(51) Int. Cl.
H04W 72/12 (2009.01)
H04W 88/04 (2009.01)
H04W 84/12 (2009.01)

(56) References Cited

U.S. PATENT DOCUMENTS

| | | | |
|---|---|---|---|
| 2013/0016649 A1* | 1/2013 | Damnjanovic | H04W 88/04 370/315 |
| 2013/0223394 A1* | 8/2013 | Nishio | H04L 1/0029 370/329 |
| 2014/0198716 A1* | 7/2014 | Speight | H04W 72/04 370/315 |
| 2016/0219491 A1* | 7/2016 | Sakurai | H04W 52/0245 |
| 2017/0104659 A1* | 4/2017 | Suh | H04B 7/0619 |
| 2017/0280363 A1* | 9/2017 | Tenny | H04W 8/14 |
| 2019/0082461 A1* | 3/2019 | Guo | H04L 5/0094 |

OTHER PUBLICATIONS 802.11 Working Group of the LAN/MAN Standards Committee of the IEEE Computer Society, Draft Standard for Information technology—Telecommunications and information exchange between systems Local and metropolitan area networks—Specific requirements, IEEE P802.11ah™/D5.0, Mar. 2015, 632 Pages.

* cited by examiner

ENABLING RELAYED COMMUNICATION IN A WIRELESS COMMUNICATION SYSTEM

CROSS REFERENCE TO RELATED APPLICATIONS

This application is a 35 U.S.C. § 371 national stage application of PCT International Application No. PCT/SE2016/051030 filed on Oct. 21, 2016 the disclosure and content of which is incorporated by reference herein in its entirety.

TECHNICAL FIELD

The proposed technology generally relates to wireless communication systems and relayed communications in such systems. More specifically, the proposed technology relates to methods for enabling relayed communication and corresponding network devices and relay units, as well as corresponding computer programs and computer program products and apparatuses for enabling relayed communication.

BACKGROUND

In order to improve wireless communication systems and/or extend the coverage or efficiency of communication, relayed communications may be employed.

By way of example, it may be beneficial to enable relayed communication in Wireless Local Area Network, WLAN, systems or similar systems. For example, relayed communications may be useful in systems for wireless sensor communications, but is generally applicable to extend coverage and/or efficiency.

A wireless sensor network, for example, normally comprises spatially distributed autonomous devices in order to monitor and/or actuate physical or environmental conditions. Among all these devices, some of them are resource constrained in terms of computational power and power supply. Due to this reason, the wireless sensor network usually employs a star topology as shown in FIG. 1 when communicating between resource constrained devices and non-constrained devices.

As shown in FIG. 1, the resource constrained devices only communicate with the non-resource constrained devices. If two resource constrained devices need to communicate with each other, it needs to be done via the non-resource constrained device. Such a topology is known as star topology. Different access technologies for wireless sensor networks have been extensively studied during the last 3 decades, and access technologies such as CSMA/CA and TDMA are widely applied in different wireless sensor network protocols.

In order to extend the network coverage of wireless sensor network, the star topology could be expanded by interconnecting multiple non-resource constrained devices together. As a result, a multi-hop network is created as shown in FIG. 2. Different network routing algorithms have been developed to create and maintain such a topology. The Ad-hoc On Demand Distance Vector (AODV) and IPv6 Routing Protocol for Low-Power and Lossy Networks (RPL) are widely utilized in wireless sensor networks for message forwarding in a multi-hop network.

In IEEE, endeavors in the 802.11ah task group have been taken for the sensor device class of devices. This has resulted in the Wi-Fi alliance (WFA) standard HaLow. IEEE 802.11ah is designed to operate in the sub 1 GHz band (S1G) with the specific goal of low power and long range. As a part of achieving these goals a new kind of relaying scheme was introduced.

A station in an 802.11ah network can become a S1G Relay for communication between an access point (AP) and another station (STA) if it signals support for relaying to the access point.

As illustrated in FIG. 3, once the AP has gained channel access it may initiate relayed communication by means of a so-called trigger frame, which is sent to the considered STA via the relay. An uplink data transmission from the STA to the relay is performed as an immediate response to the trigger frame. The packet is received, and acknowledged (ACK) by the S1G Relay, who then encapsulates the message into another packet and forwards it to the AP. For downlink data, the AP in turn transmits data in the encapsulated format to the S1G Relay, which removes the encapsulation and then forwards it to the STA. Basically, when using a S1G relay, all downlink and the uplink communication are performed via the relay, including trigger frames, data and acknowledgments.

However, the relay operation of IEEE 802.11 ah is a semi-static and distributed solution. It is not possible for the AP to have any control over the uplink relay transmissions, nor is it possible to achieve any coordination gain. For more details regarding S1G Relays, reference can be made to the 802.11ah amendment document [1].

There is a general need for improvements when it comes to relayed communication in wireless communication systems.

SUMMARY

It is a general object to enable and/or improve relayed communication in wireless communication systems.

It is an object to provide a method performed by a network device for enabling relayed communication in at least one direction between a first communication unit and a second communication unit in a wireless communication system.

It is also an object to provide a complementary method performed by a network device for enabling relayed communication in at least one direction between a first 25 communication unit and a second communication unit in a wireless communication system.

Another object is to provide a method performed by a relay unit for enabling relayed communication between a first communication unit and a second communication unit in a wireless communication system.

Yet another object is to provide a network device configured to enable relayed communication in at least one direction between a first communication unit and a second communication unit in a wireless communication system.

Still another object is to provide a complementary network device configured to enable relayed communication in at least one direction between a first communication unit and a second communication unit in a wireless communication system.

It is also an object to provide a relay unit configured to enable relayed communication between a first communication unit and a second communication unit in a wireless communication system.

Another object is to provide various computer programs for enabling, when executed, relayed communication in at least one direction between a first communication unit and a second communication unit in a wireless communication system.

Yet another object is to provide corresponding computer-program products.

Still another object is to provide various apparatuses for enabling relayed communication in at least one direction between a first communication unit and a second communication unit in a wireless communication system.

These and other objects are met by embodiments of the proposed technology.

According to a first aspect, there is provided a method performed by a network device for enabling relayed communication in at least one direction between a first communication unit and a second communication unit in a wireless communication system. The method comprises:

the network device specifying a relay unit for the relayed communication;

the network device determining information for scheduling and/or configuring a first transmission of a data frame from the second communication unit to the specified relay unit and a second transmission of the data frame from the specified relay unit to the first communication unit; and the network device generating a trigger frame including the information for scheduling and/or configuring the first transmission and the second transmission.

In this way, a much more advanced trigger of relayed communication between a first communication unit and a second communication unit is enabled. The trigger frame includes information for scheduling and/or configuring a first transmission from the second communication unit to the specified relay unit as well as a second transmission from the specified relay unit to the first communication unit.

According to a second aspect, there is provided a method performed by a network device for enabling relayed communication in at least one direction between a first communication unit and a second communication unit in a wireless communication system. The method comprises:

the network device receiving a trigger frame from the first communication unit, wherein the trigger frame includes information for scheduling and/or configuring a first transmission of a data frame from the second communication unit to a specified relay unit and a second transmission of the data frame from the specified relay unit to the first communication unit; and the network device preparing the data frame for the first transmission of the data frame to the specified relay unit according to at least part of the information included in the trigger frame.

According to a third aspect, there is provided a method performed by a relay unit for enabling relayed communication between a first communication unit and a second communication unit in a wireless communication system. The method comprises:

the relay unit receiving information for scheduling and/or configuring the relayed communication, wherein the information originates from a trigger frame originally transmitted by the first communication unit;

the relay unit receiving a data frame from the second communication unit; and the relay unit transmitting the data frame to the first communication unit according to the information for scheduling and/or configuring the relayed communication.

According to a fourth aspect, there is provided a network device configured to enable relayed communication in at least one direction between a first communication unit and a second communication unit in a wireless communication system. The network device is configured to specify a relay unit for the relayed communication. The network device is configured to determine information for scheduling and/or configuring a first transmission of a data frame from the second communication unit to the specified relay unit and a second transmission of the data frame from the specified relay unit to the first communication unit. The network device is also configured to generate a trigger frame including the information for scheduling and/or configuring the first transmission and the second transmission.

According to a fifth aspect, there is provided a network device configured to enable relayed communication in at least one direction between a first communication unit and a second communication unit in a wireless communication system. The network device is configured to receive a trigger frame from the first communication unit, wherein the trigger frame includes information for scheduling and/or configuring a first transmission of a data frame from the second communication unit to a specified relay unit and a second transmission of the data frame from the specified relay unit to the first communication unit. The network device is also configured to prepare the data frame for the first transmission of the data frame to the specified relay unit according to at least part of the information included in the trigger frame.

According to a sixth aspect, there is provided a relay unit configured to enable relayed communication between a first communication unit and a second communication unit in a wireless communication system. The relay unit is configured to receive information for scheduling and/or configuring the relayed communication, wherein the information originates from a trigger frame originally transmitted by the first communication unit. The relay unit is configured to receive a data frame from the second communication unit. The relay unit is configured to transmit the data frame to the first communication unit according to the information for scheduling and/or configuring the relayed communication.

According to a seventh aspect, there is provided a computer program for enabling, when executed, relayed communication in at least one direction between a first communication unit and a second communication unit in a wireless communication system. The computer program comprises instructions, which when executed by at least one processor, cause the at least one processor to:

specify a relay unit for the relayed communication;

determine information for scheduling and/or configuring a first transmission of a data frame from the second communication unit to the specified relay unit and a second transmission of the data frame from the specified relay unit to the first communication unit; and generate a trigger frame including the information for scheduling and/or configuring the first transmission and the second transmission.

According to an eighth aspect, there is provided a computer program for enabling, when executed, relayed communication in at least one direction between a first communication unit and a second communication unit in a wireless communication system. The computer program comprises instructions, which when executed by at least one processor, cause the at least one processor to:

read a trigger frame received from the first communication unit, wherein the trigger frame includes information for scheduling and/or configuring a first transmission of a data frame from the second communication unit to a specified relay unit and a second transmission of the data frame from the specified relay unit to the first communication unit; and prepare the data frame for the first transmission of the data frame to the specified relay unit according to at least part of the information included in the trigger frame.

According to a ninth aspect, there is provided a computer program for enabling, when executed, relayed communication in at least one direction between a first communication unit and a second communication unit in a wireless communication system. The computer program comprises instructions, which when executed by at least one processor, cause the at least one processor to:

read information for scheduling and/or configuring the relayed communication, wherein the information originates from a trigger frame originally transmitted by the first communication unit;

read a data frame received from the second communication unit; and prepare the data frame for transmission to the first communication unit according to the information for scheduling and/or configuring the relayed communication.

According to a tenth aspect, there is provided a computer-program product comprising a computer-readable medium having stored thereon a computer program according to any of the seventh, eighth or ninth aspects.

According to an eleventh aspect, there is provided an apparatus for enabling relayed communication in at least one direction between a first communication unit and a second communication unit in a wireless communication system. The apparatus comprises:

a specifying module for specifying a relay unit for the relayed communication;

a determining module for determining information for scheduling and/or configuring a first transmission of a data frame from the second communication unit to the specified relay unit and a second transmission of the data frame from the specified relay unit to the first communication unit; and a generating module for generating a trigger frame including the information for scheduling and/or configuring the first transmission and the second transmission.

According to a twelfth aspect, there is provided an apparatus for enabling relayed communication in at least one direction between a first communication unit and a second communication unit in a wireless communication system. The apparatus comprises:

a reading module for reading a trigger frame received from the first communication unit, wherein the trigger frame includes information for scheduling and/or configuring a first transmission of a data frame from the second communication unit to a specified relay unit and a second transmission of the data frame from the specified relay unit to the first communication unit; and a preparation module for preparing the data frame for the first transmission of the data frame to the specified relay unit according to at least part of the information included in the trigger frame.

According to a thirteenth aspect, there is provided an apparatus for enabling relayed communication in at least one direction between a first communication unit and a second communication unit in a wireless communication system. The apparatus comprises:

an information reading module for reading information for scheduling and/or configuring the relayed communication, wherein the information originates from a trigger frame originally transmitted by the first communication unit;

a data frame reading module for reading a data frame received from the second communication unit; and a preparation module for preparing the data frame for transmission to the first communication unit according to the information for scheduling and/or configuring the relayed communication.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

As used herein, the non-limiting term "communication unit" refers to any unit or device that is capable of communication in a wireless communication system, including but not limited to network nodes and/or associated wireless communication devices.

The term "relay unit" refers to any unit or device that is capable of communication in a wireless communication system for assisting in relayed communication, including but not limited to network nodes and/or associated wireless communication devices.

As used herein, the non-limiting terms "wireless communication device", "station", "User Equipment (UE)", and "terminal" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to access points, base stations, control nodes such as access controllers, network controllers, radio network controllers, base station controllers, and the like.

As used herein, the term "network device" may refer to any device located in connection with a communication network, including but not limited to devices in access networks, core networks and similar network structures. The term network device may also encompass cloud-based network devices.

For a better understanding of the proposed technology, it may be useful to begin with a brief system overview.

Figure 1:
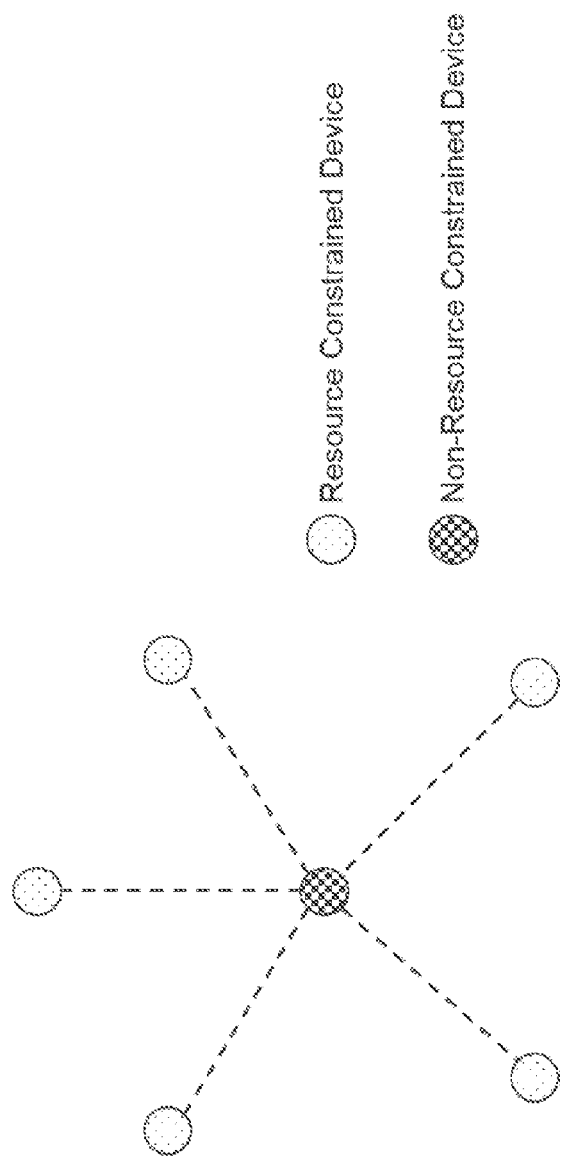
FIG. 1 is a schematic diagram illustrating an example of a star topology for communication between communication units.
Figure 2:
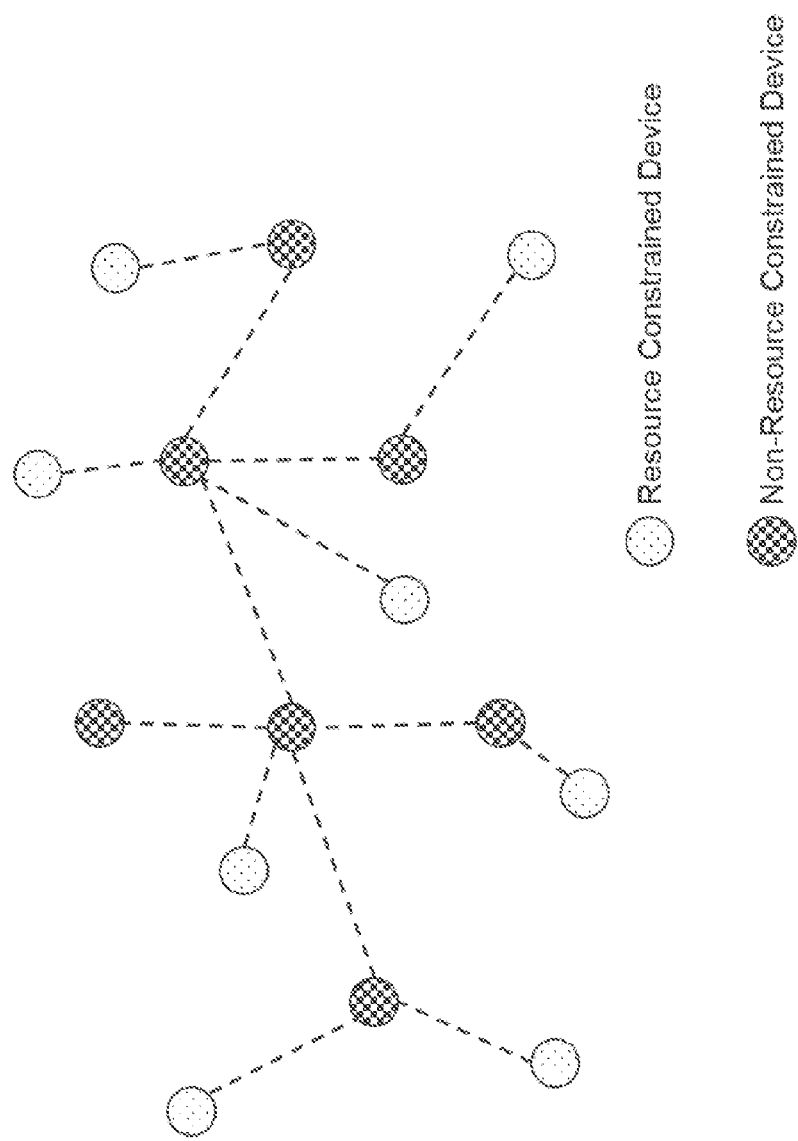
FIG. 2 is a schematic diagram illustrating an example of a multi-hop topology for communication between communication units.
Figure 3:
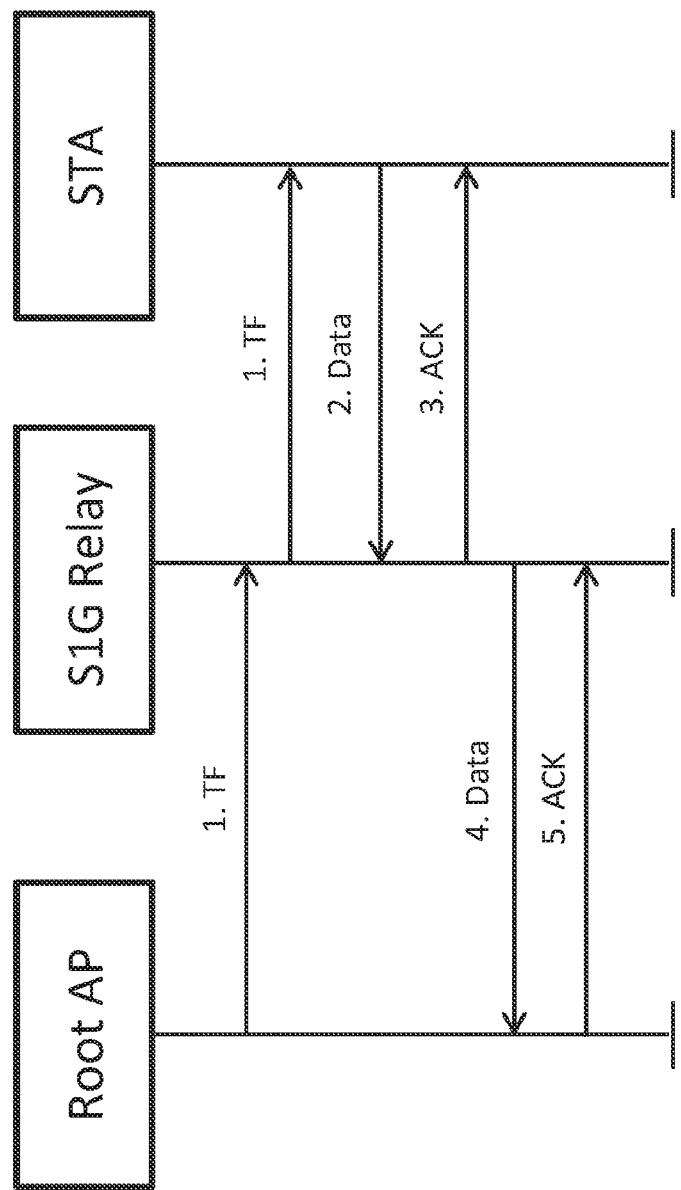
FIG. 3 is a schematic signaling diagram illustrating an example of relayed communication between an access point and an associated station in a wireless network.
Figure 4:
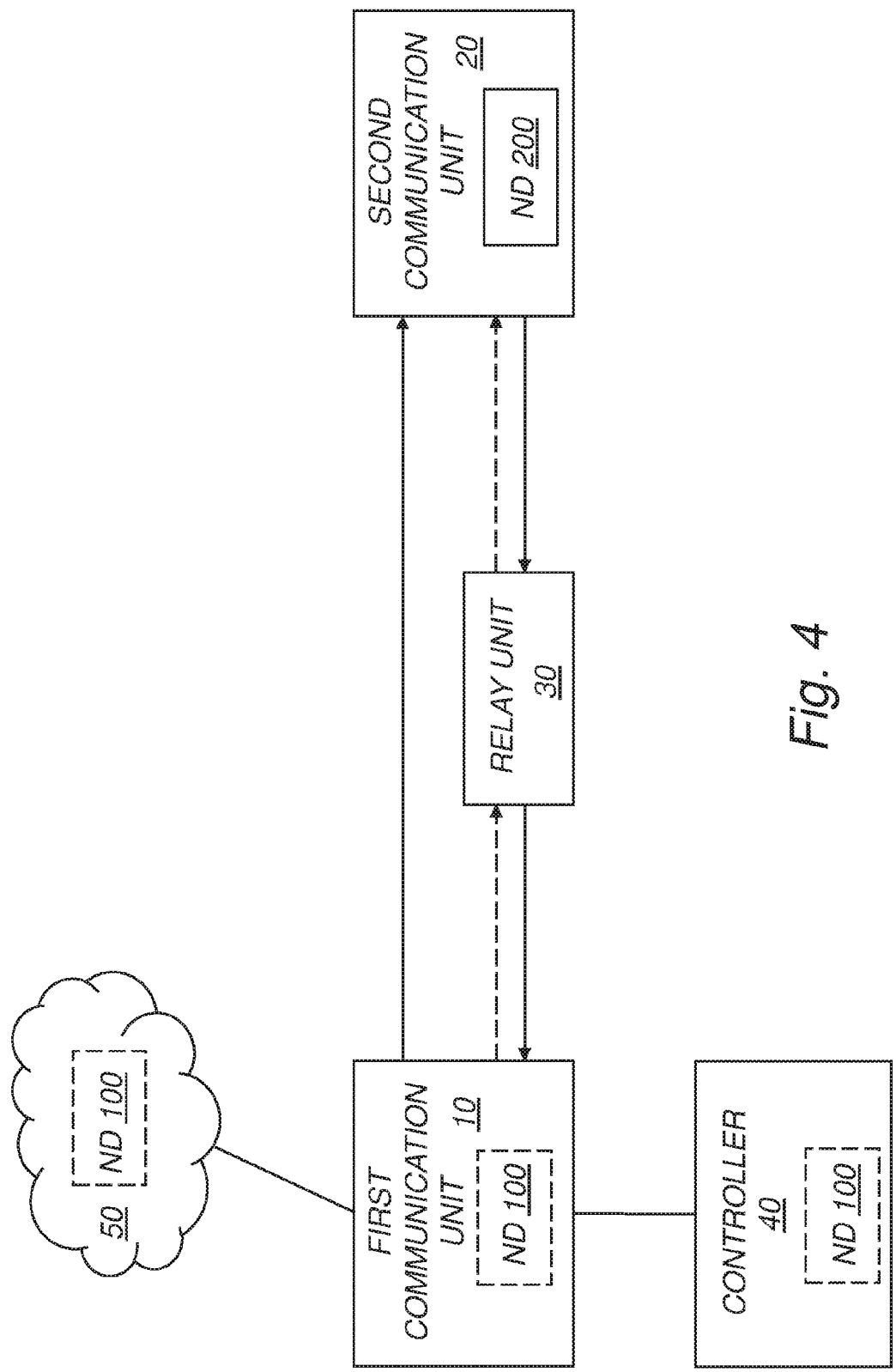
FIG. 4 is a schematic diagram illustrating an example of relevant parts of a wireless communication system including at least a first communication unit, a second communication unit and a relay unit according to an embodiment.

FIG. 4 is a schematic diagram illustrating an example of relevant parts of a wireless communication system including at least a first communication unit 10, a second communication unit 20 and a relay unit 30. Optionally, the first communication unit has an associated controller 40. The wireless communication system may also be arranged for connection with the so-called cloud 50 if desired.

The proposed technology relates to various complementary mechanisms for enabling relayed communication in at least one direction between the first communication unit and the second communication unit 20.

The proposed technology may be implemented in various communication units such as the first communication unit 10, the second communication unit 20 and/or the relay unit 30, and/or implemented in network devices 100, 200 in various optional locations.

Figure 5:
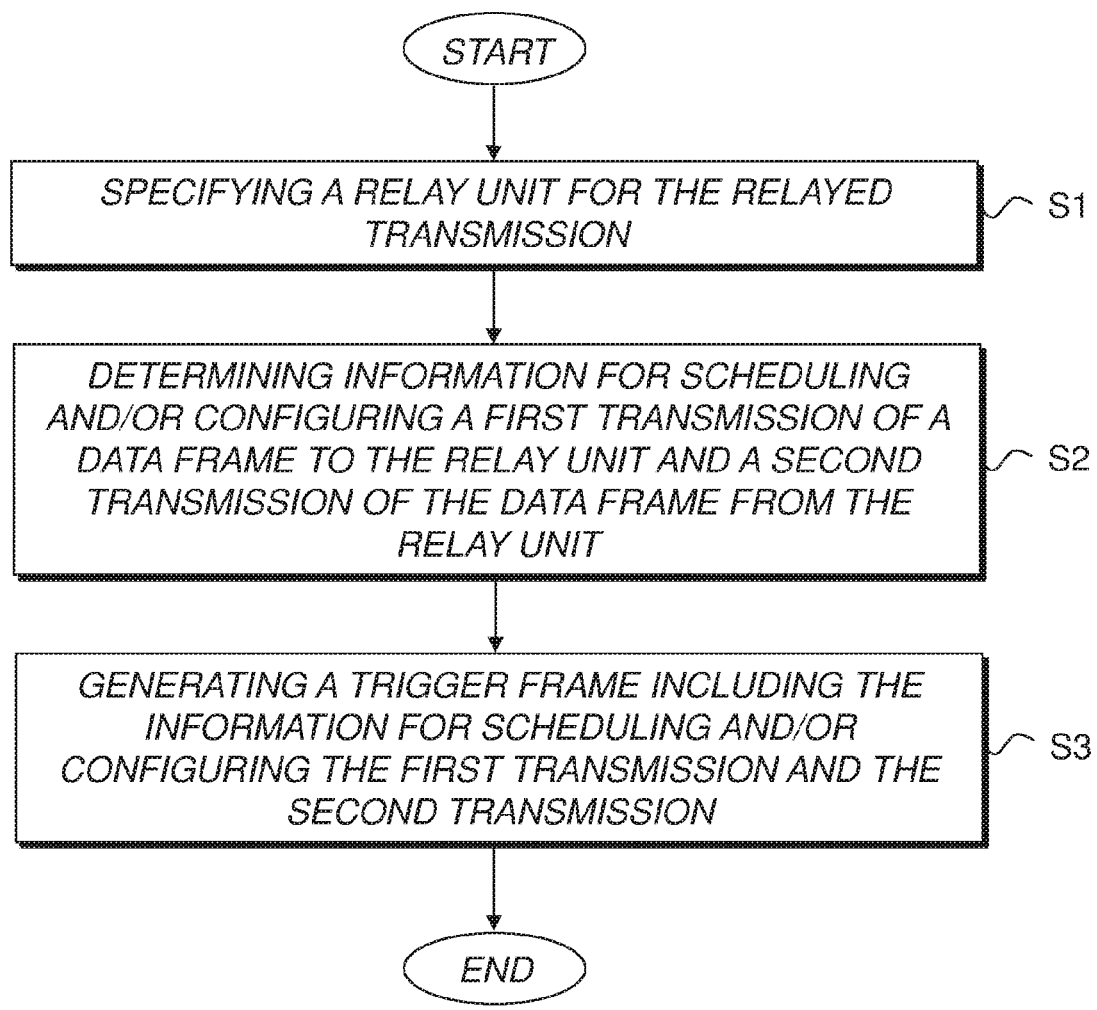
FIG. 5 is a schematic flow diagram illustrating an example of a method performed by a network device for enabling relayed communication in a wireless communication system according to an embodiment.

FIG. 5 is a schematic flow diagram illustrating an example of a method performed by a network device 100 for enabling relayed communication in at least one direction between a first communication unit 10 and a second communication unit 20 in a wireless communication system.

Basically, the method comprises the following steps:

S1: the network device specifying a relay unit 30 for the relayed communication;

S2: the network device determining information for scheduling and/or configuring a first transmission of a data frame from the second communication unit 20 to the specified relay unit 30 and a second transmission of the data frame from the specified relay unit 30 to the first communication unit 10; and S3: the network device generating a trigger frame including the information for scheduling and/or configuring the first transmission and the second transmission.

In this way, a much more advanced trigger of relayed communication between a first communication unit and a second communication unit is enabled. The trigger frame includes information for scheduling and/or configuring a first transmission from the second communication unit to the specified relay unit as well as a second transmission from the specified relay unit to the first communication unit.

By way of example, the network device 100 may be included in the first communication unit 10, or an associated controller 40 connected thereto, and the first communication unit 10 may transmit the trigger frame to the second communication unit 20.

Alternatively, the network device 100 may be a cloud-based network device transferring the trigger frame to the first communication unit 10 for subsequent transmission to the second communication unit 20.

In a particular example, the first communication unit 10 transmits the trigger frame in a direct transmission to the second communication unit 20.

For example, the trigger frame includes information indicating the address of the second communication unit as well as information indicating the address of the specified relay unit as a target address of the first transmission of the data frame from the second communication unit.

The trigger frame may include information indicating a time period to perform the first transmission and/or a time period to perform the second transmission. This could for example be a Transmission Opportunity, TXOP, according to IEEE 802.11. A TXOP is normally a bounded time interval in which a station is permitted to transfer a series of one or more frames.

By way of example, the trigger frame may include information indicating a transmission configuration for the first transmission and/or a transmission configuration for the second transmission.

For example, the information indicating a transmission configuration for the first transmission and/or a transmission configuration for the second transmission may include information indicating transmission duration, transmit power, modulation and coding scheme and/or radio resource allocation.

In a particular example, the network device may select the relay unit from a set of relay units within communication range of the second communication unit, as experienced by the first communication unit.

As an example, the network device may select the relay unit from the set of relay units based on load and/or radio conditions of the relay units.

Optionally, the network device may schedule the first transmission and/or the second transmission to be aggregated with at least one additional transmission.

Figure 8:
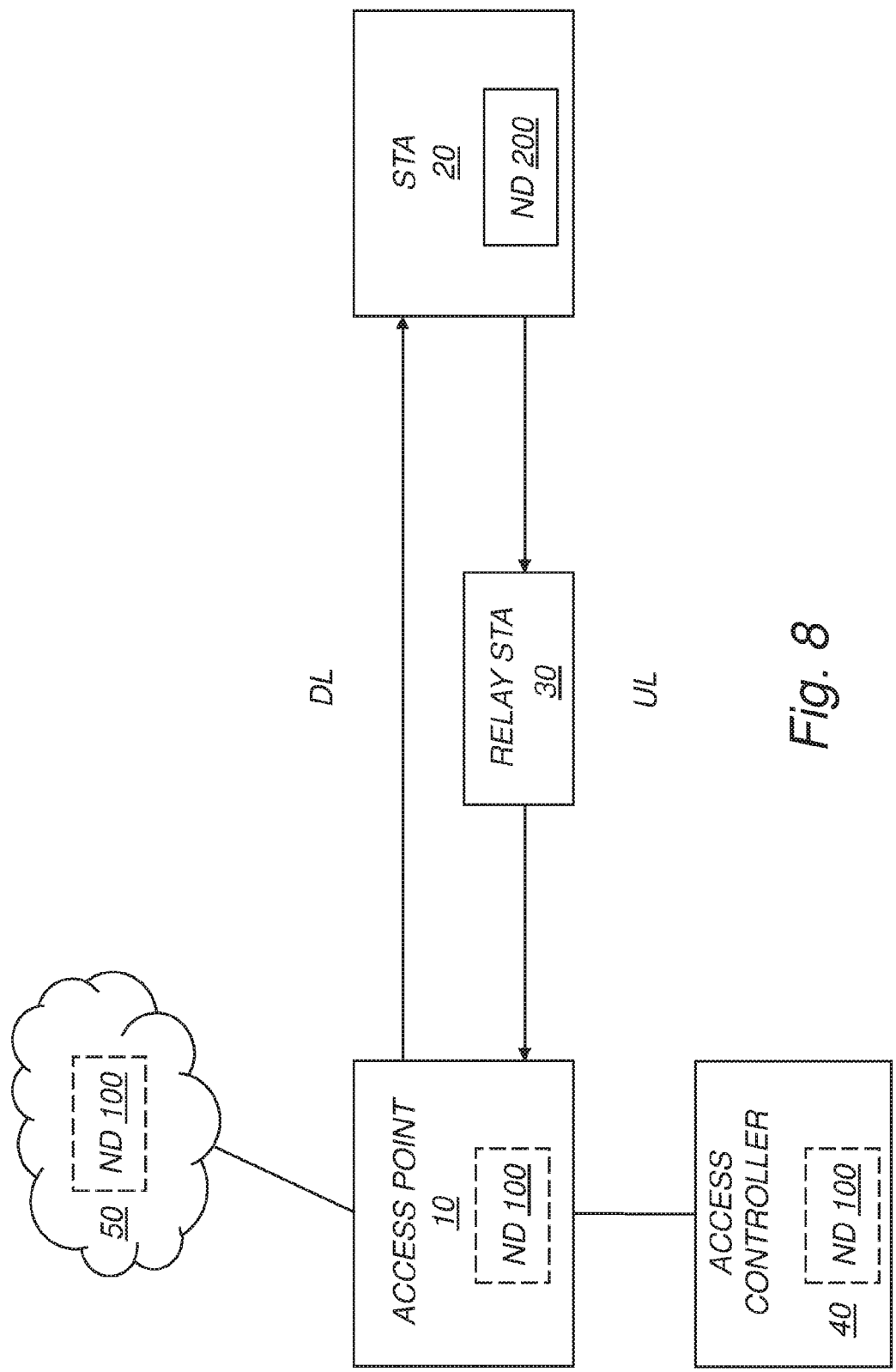
FIG. 8 is a schematic diagram illustrating an example of relevant parts of a wireless communication system in the form of a Wireless Local Area Network, WLAN, including at least an access point acting as a first communication unit, a station acting as a second communication unit and another station acting as a relay unit according to an embodiment.

In a non-limiting example, the wireless communication system is a Wireless Local Area Network, WLAN, as schematically illustrated in FIG. 8. Accordingly, the first communication unit 10 may thus be an access point, AP, and the second communication unit 20 may be a wireless device, STA, and the relay unit 30 may be another wireless device, STA, also referred to as a relay STA. The access point 10 may be associated with an access controller 40 and/or a computing cloud 50, in similarity to the example of FIG. 4.

In this example, the access point 10 may transmit the trigger frame in a direct downlink, DL, control transmission to the STA 20 acting as the second communication unit to trigger an uplink, UL, relay transmission from the STA 20 acting as the second communication unit to the access point 10 via the STA 30 acting as the relay unit.

This may be accomplished by including, in the trigger frame, information for scheduling and/or configuring the first transmission from the STA 20 to the specified relay STA as well as the second transmission from the specified relay STA 30 to the access point 10.

Figure 6:
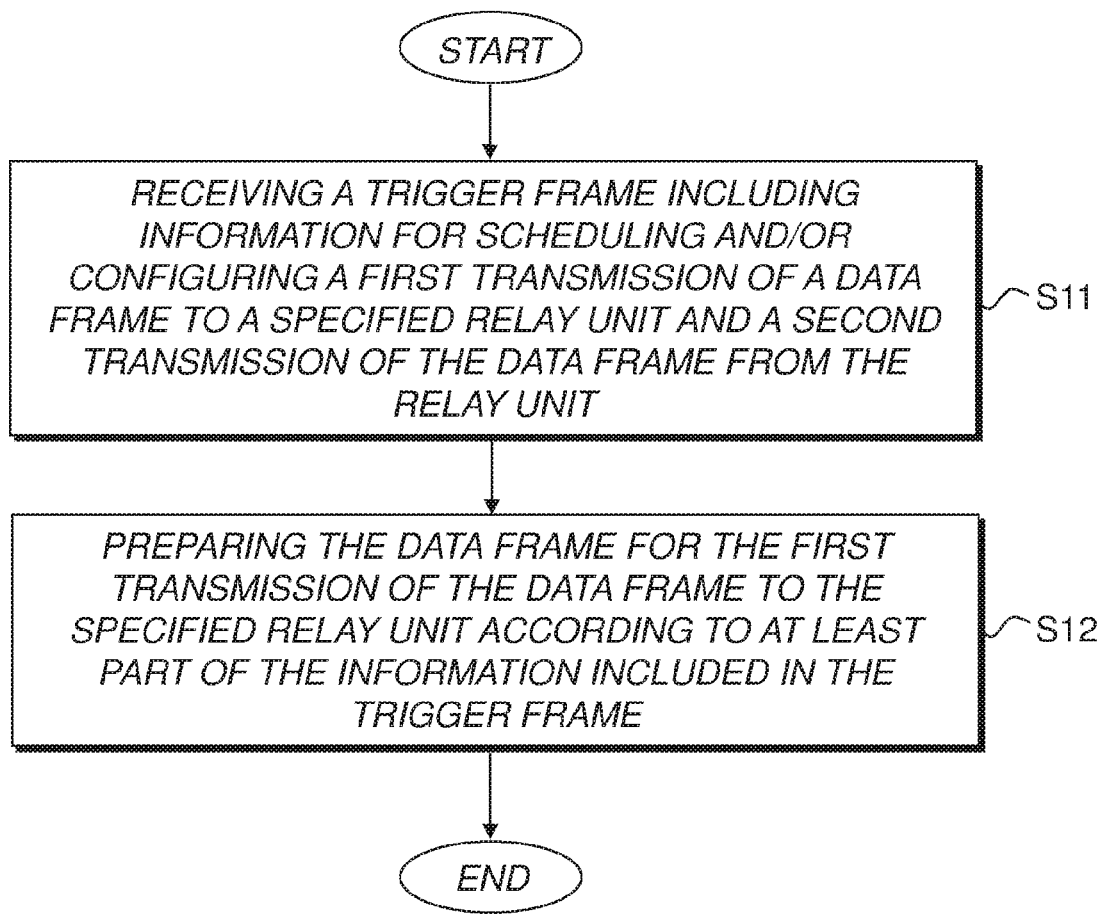
FIG. 6 is a schematic flow diagram illustrating an example of a method performed by a network device for enabling relayed communication in a wireless communication system according to an embodiment.

FIG. 6 is a schematic flow diagram illustrating an example of a method performed by a network device 200 for enabling relayed communication in at least one direction between a first communication unit 10 and a second communication unit 20 in a wireless communication system.

Basically, the method comprises the following steps:
S11: the network device receiving a trigger frame from the first communication unit 10, wherein the trigger frame includes information for scheduling and/or configuring a first transmission of a data frame from the second communication unit 20 to a specified relay unit 30 and a second transmission of the data frame from the specified relay unit 30 to the first communication unit 10; and
S12: the network device preparing the data frame for the first transmission of the data frame to the specified relay unit 30 according to at least part of the information included in the trigger frame.

By way of example, the network device 200 may be included in the second communication unit 20.

For example, the second communication unit 20 may receive the trigger frame in a direct transmission from the first communication unit 10.

As an example, the trigger frame may include information indicating the address of the specified relay unit 30 as a target address of the first transmission of the data frame from the second communication unit 20, and the second communication unit 20 may then extract the address of the specified relay unit 30.

In a particular example, the network device extracts information for scheduling and/or configuring the first transmission from the trigger frame and transmits the data frame to the specified relay unit according to the extracted information for scheduling and/or configuring the first transmission.

For example, the network device may extract information for scheduling and/or configuring the second transmission from the trigger frame and transmit the information to the relay unit to enable scheduling and/or configuring of the second transmission of the data frame from the specified relay unit to the first communication unit.

As previously indicated, the wireless communication system may for example be a Wireless Local Area Network, WLAN, and the first communication unit may be an access point, AP, and the second communication unit may be a wireless device, STA, and the relay unit may be another wireless device, STA.

Figure 7:
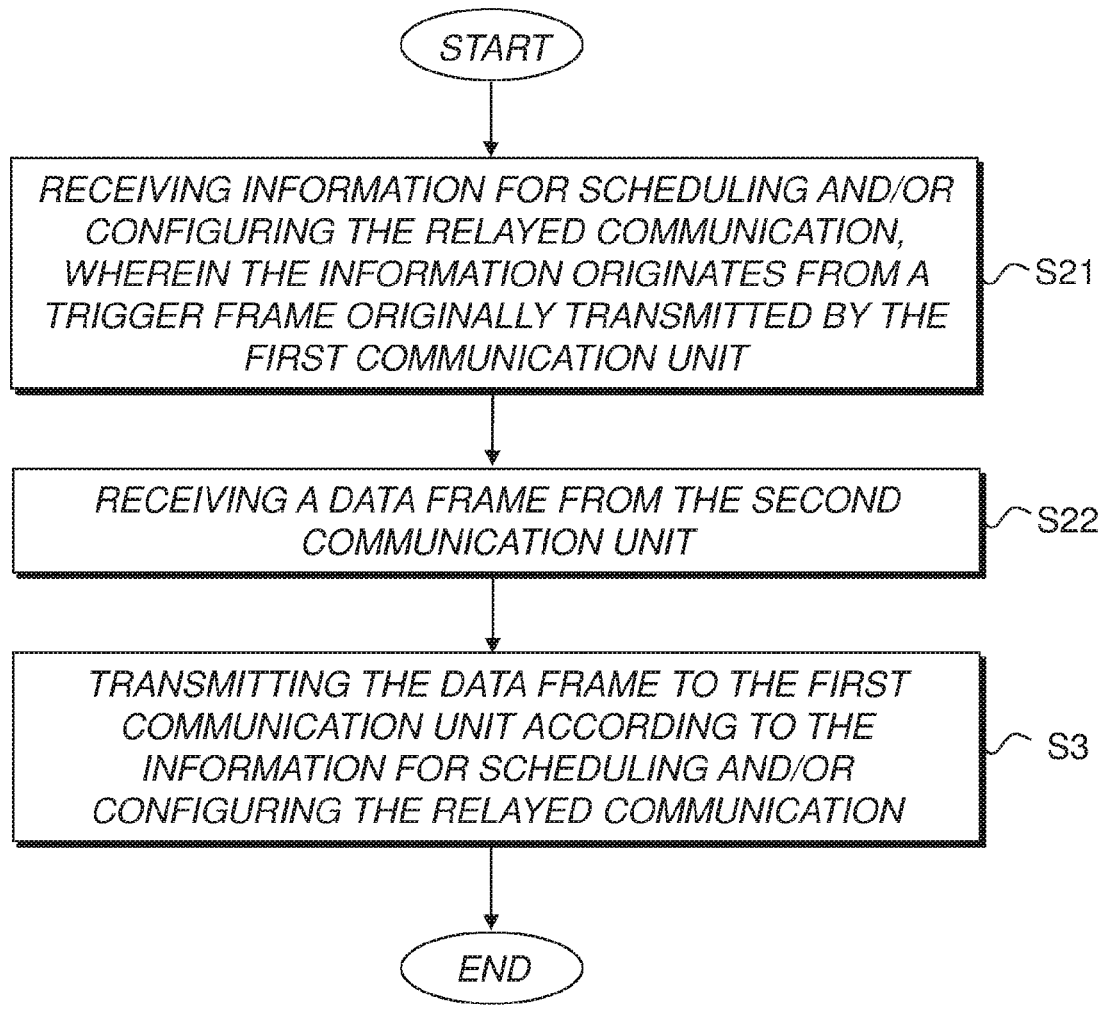
FIG. 7 is a schematic flow diagram illustrating an example of a method performed by a relay unit for enabling relayed communication according to an embodiment.

FIG. 7 is a schematic flow diagram illustrating an example of a method performed by a relay unit 30 for enabling relayed communication between a first communication unit and a second communication unit 20 in a wireless communication system.

Basically, the method comprises:
S21: the relay unit 30 receiving information for scheduling and/or configuring the relayed communication, wherein the information originates from a trigger frame originally transmitted by the first communication unit 10;
S22: the relay unit receiving a data frame from the second communication unit 20;
S23: the relay unit transmitting the data frame to the first communication unit 10 according to the information for scheduling and/or configuring the relayed communication.

By way of example, the relay unit may receive the trigger frame and extract the information for scheduling and/or configuring the relayed communication from the trigger frame.

Alternatively, or as a complement, the relay unit receives the information for scheduling and/or configuring the relayed communication via the second communication unit.

In the following, the proposed technology will be described with reference to non-limiting examples in the context of a WLAN involving access points and associated stations. It should be understood that the proposed technology is not limited thereto, but rather generally applicable to any suitable wireless communication system supporting relayed communication.

According to a particular example, the proposed technology enables an access point, sometimes referred to as a root AP, to control relay transmissions by explicitly scheduling the uplink, UL, transmissions through a relay.

By way of example, the root AP may send a frame towards a STA to trigger an UL relay transmission. For example, the frame may indicate the relay node address as well as other scheduling and/or transmission configurations. The frame may initiate a transmission opportunity for the transmission from the STA to the relay as well as the transmission from the relay to the root AP.

The proposed technology may improve system efficiency by enabling the AP to control relay transmissions. It also allows asymmetry in the relaying in the sense that UL may be performed through a relay while DL may be performed without a relay. With the asymmetric relaying, the radio resources may be used more efficiently with one direct transmission instead of two-hop transmissions in the legacy case. Besides, when the AP schedules all transmissions it has a higher degree of freedom to aggregate multiple transmissions to optimize radio resource utilization. Furthermore, the AP may select a relay dynamically for each transmission, e.g. based on the instantaneous load and interference conditions at each relay.

Figure 9:
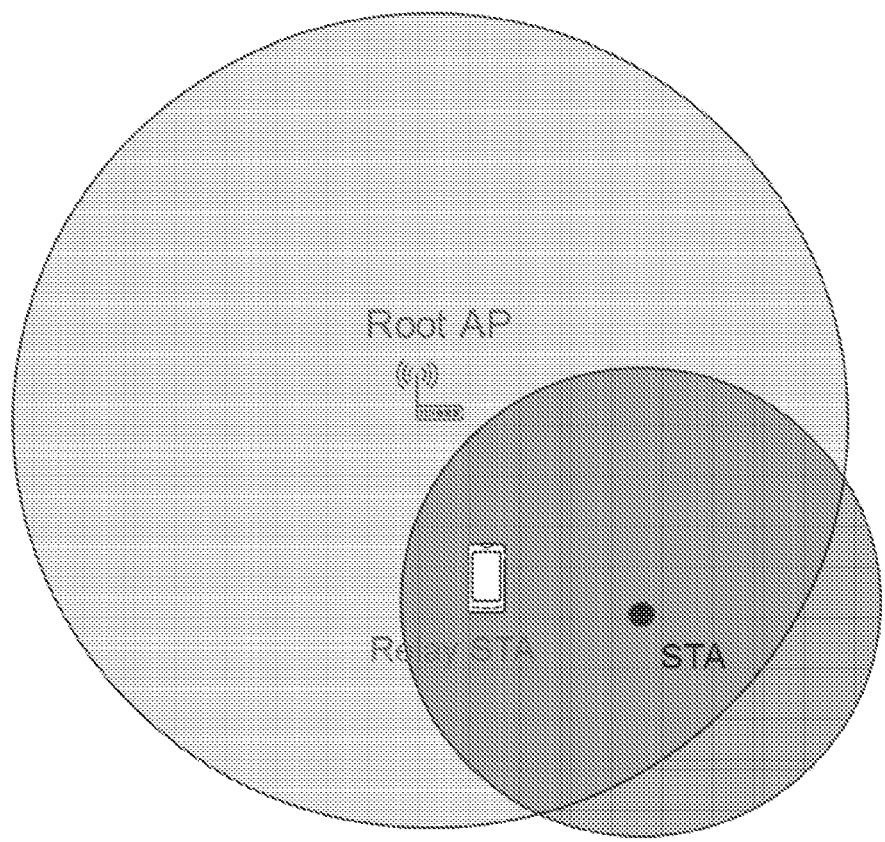
FIG. 9 is a schematic diagram illustrating a first example of the communication ranges of an access point and an associated station.
Figure 10:
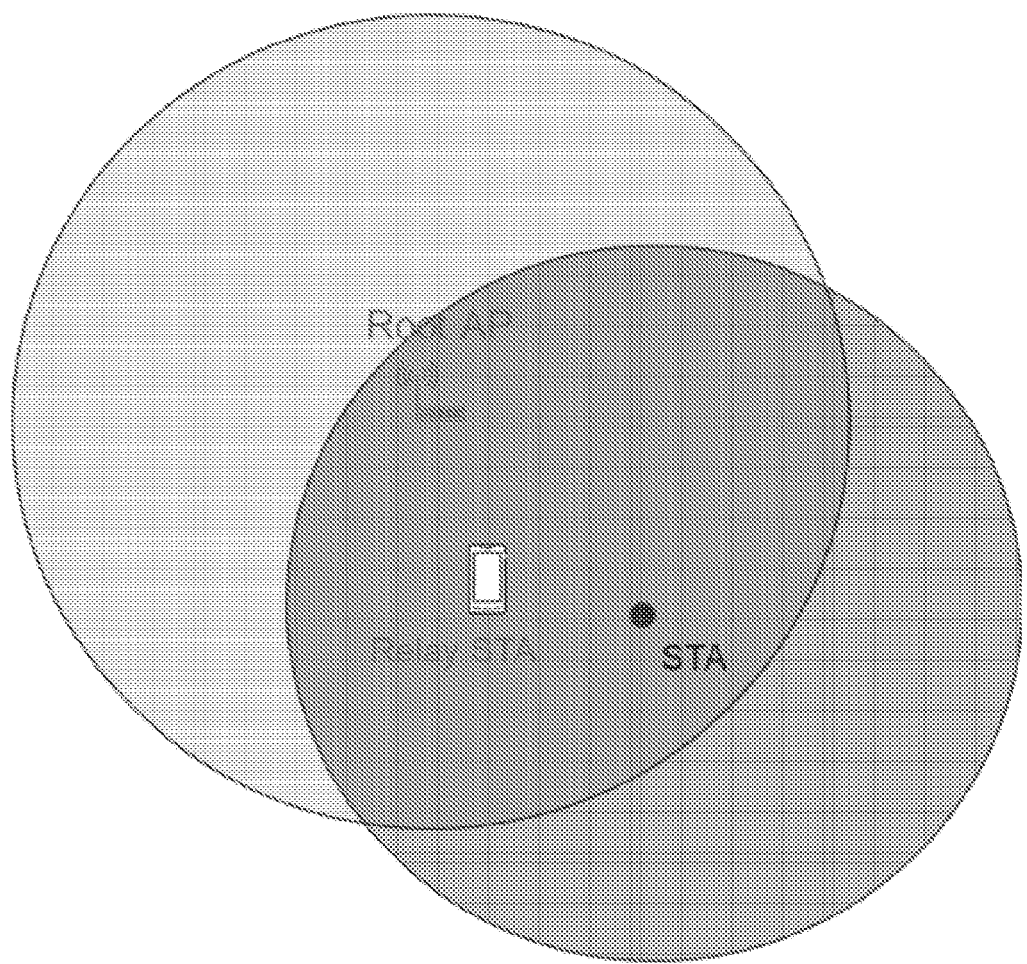
FIG. 10 is a schematic diagram illustrating a second example of the communication ranges of an access point and an associated station.

In a wireless communication system as shown in FIGS. 9 and 10, the Root AP is an access point and Relay STA and STA are associated with the Root AP. The circles in FIGS. 9 and 10 show the communication range for the Root AP and the STA. Both Relay STA and STA are in the coverage range of the Root AP. Relay STA is in the communication range of the STA.

FIG. 9 shows the case where the STA is not in the communication range of the Root AP. Then all communication to the Root AP has to go through the Relay STA. However, since the Root AP may have more transmission power, it can reach the STA without a relay.

FIG. 10 shows the case where the STA may reach the Root AP without the Relay STA. However, the channel to the Root AP may be so poor that the lowest rate MCS needs to be used. In the case where the STA needs to transmit a large amount of data, it may then be beneficial to use the Relay STA in order to increase the rate of the communication. The Root AP may then respond directly to the STA, without using the Relay STA.

The proposed technology may thus also apply to the scenarios where the Root AP resides inside the transmission range of the STA. It should be noted that even in this scenario the UL relay transmission may be preferred to direct transmission to save battery life of the STA which may be a sensor type device. When the channel between the Root AP and the STA is relatively poor, the STA may have to either increase transmission power or use a large low-rate MCS to reach the Root AP. Therefore, the direct transmission may consume much more power comparing to the relay transmission. However, if the Root AP has capability of higher transmit power, it may communicate the STA directly, without going through the Relay.

Embodiments of the proposed technology are designed to enable the Root AP to schedule the uplink transmissions of the entire communication path from the STA to the Root AP through the Relay STA.

Figure 11:
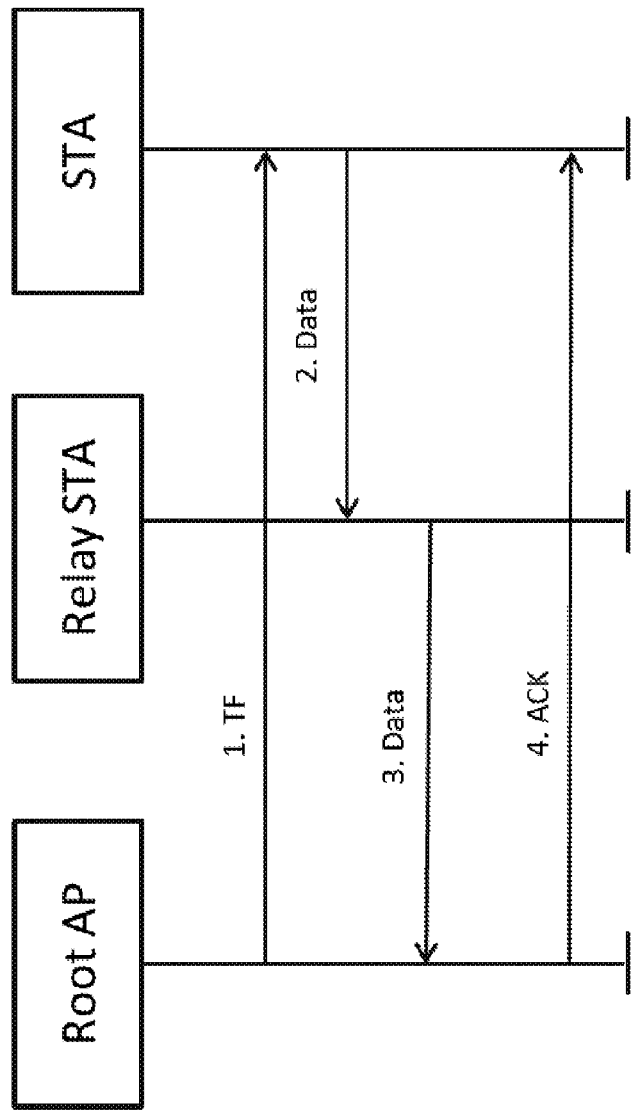
FIG. 11 is a schematic signaling diagram illustrating an example of relayed communication between an access point and an associated station in a wireless network according to an embodiment.

FIG. 11 is a schematic signaling diagram illustrating an example of relayed communication between an access point and an associated station in a wireless network according to an embodiment.

In this particular example, it is assumed that the Root AP maintains a list of Relay STAs that are in the transmission range of the STA and so-called relay-capable STAs. Such knowledge may be acquired in the association phase of the STA. The knowledge may also be updated periodically or on demand after the association.

In step 1, a Trigger Frame, TF, is sent from the Root AP to the STA, preferably as a direct transmission. The TF will trigger an UL transmission from the STA through the Relay STA. After receiving the TF, the STA transmits a data frame in step 2 based on the configuration specified in the TF. The Relay STA receives the data frame and relay it to the Root AP in step 3. If the relayed data is decoded correctly, the Root AP sends an ACK frame in step 4 to the STA to indicate successful transmission.

Data transmission in step 2, relay transmission in step 3 and ACK transmission in step 4 may be aggregated with transmissions to and/or from other nodes. Typical aggregation methods are Orthogonal Frequency Division Multiple Access, OFDM-A, and Multi-User Multiple Input Multiple Output, MU-MIMO.

Figure 12:
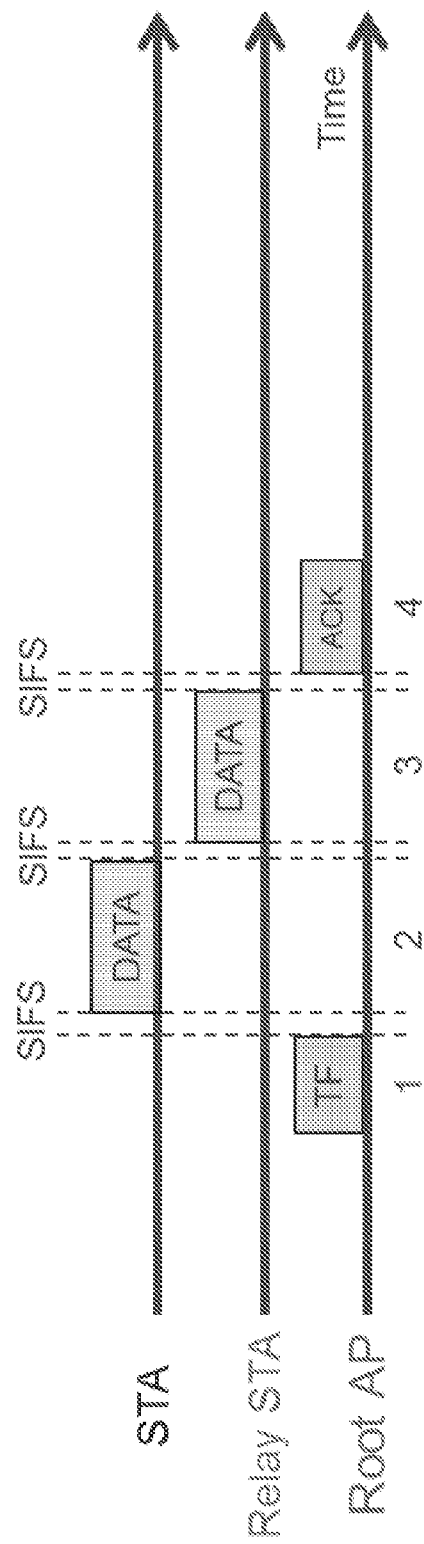
FIG. 12 is a schematic timing diagram illustrating an example of a possible sequence of transmissions according to an embodiment.

FIG. 12 is a schematic timing diagram illustrating an example of a possible sequence of transmissions according to an embodiment. This represents a time sequence presentation of the frame transmission.

Note that typically the STA expects to receive the ACK within a so-called Short Inter-Frame Space, SIFS, after the data was sent, but it may be needed to modify this time since the ACK may arrive at the STA in a later time slot.

Examples Related to the Trigger Frame

A trigger frame, TF, may be sent by the Root AP and received by the STA. The Relay STA may also receive and decode the TF so that it will be prepared to receive a data frame from the STA and extract configuration for the relay transmission in Step 3 (FIG. 11).

By way of example, the TF may be either a unicast frame or a multicast frame in order to trigger multi-user (MU) transmissions. Transmissions from multiple STAs may be aggregated by the Relay STA in frequency, spatial or code domain.

In a particular embodiment, the TF is a dedicated management frame. In other embodiments, the TF is either a data frame including trigger information or a management frame with multiple functionality.

For example, the TF may indicate the address of the Relay STA and the STA (or multiple STAs) with data to send. The configurations of data frame transmission in Step 2 and Step 3 (FIG. 11) are specified in the TF. The configurations may include transmission duration, modulation coding scheme, MCS, and/or radio resource allocation.

The TF may also indicate a TXOP for the scheduled transmissions so that the nodes that are not scheduled defer from transmitting during the TXOP to avoid collision and interference and reduce power consumption.

Examples Related to the Root AP

For example, the Root AP generates and transmits the TF towards scheduled STAs.

In a particular example, the Relay STA is selected from a list of relays in the communication range of the STA. When there are multiple candidates, the selection decision may take instantaneous load and radio conditions into consideration.

During the data frame transmission in Step 2 (FIG. 11), the Root AP may go to sleep if it does not expect any frames from any other nodes in order to reduce power consumption. As an alternative, the AP may try to process the data frame and combine it with the relayed data frame since they contain the same information. The latter method may potentially provide additional combination gain when the Root AP is in the communication range of the STA.

By way of example, when the data frame is received correctly, the Root AP sends an ACK to the scheduled STAs.

Examples Related to the STA

By way of example, the STA receives the TF from the Root AP, extracts Relay STA address and configurations for data frame transmission and transmits a data frame to the Relay STA according to the scheduled configuration.

In a particular embodiment, the STA also extracts the transmission configuration of the relay transmission and includes the knowledge in the data frame. When the Relay STA decodes the data frame, it also gets the scheduled configuration for the relay transmission.

For example, during the relay transmission in Step 3 (FIG. 11), the STA may enter a sleeping mode to reduce power consumption. In this case, the STA should wake up in the end of the relay transmission to receive the ACK from the Root AP.

Examples Related to the Relay STA

Normally, the Relay STA receives the data frame transmission from the STA in Step 2 and relay it to the Root AP in Step 3 (FIG. 11).

By way of example, the Relay STA expects the transmission from the STA, e.g. it has to be awake when the transmission arrives.

In a particular embodiment, the Relay STA may decode the TF and get to know it is scheduled as the relay for the upcoming transmission so that the Relay STA will be expecting the data transmission from the STA in the scheduled time slot.

The Relay STA may configure the relay transmission as specified in the TF. The configurations may include transmission duration, MCS and/or radio resource allocation.

In a particular embodiment, the Relay STA receives and decodes the TF and obtains the scheduling and/or configuration information from the TF directly. In an alternative embodiment, the configuration is extracted by the STA and included in the data frame transmission. When the data frame is decoded, the scheduling and/or configuration information is obtained at the same time.

By way of example, after receiving the data frame transmission in Step 2 and waiting for a certain time, e.g. SIFS, the Relay STA transmits the data frame to the Root AP in Step 3 according to the scheduled configuration (FIG. 11).

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology, with reference once again to FIG. 4, there is provided a network device 100 configured to enable relayed communication in at least one direction between a first communication unit 10 and a second communication unit 20 in a wireless communication system.

The network device 100 is configured to specify a relay unit 30 for the relayed communication. The network device 100 also is configured to determine information for scheduling and/or configuring a first transmission of a data frame from the second communication unit to the specified relay unit and a second transmission of the data frame from the specified relay unit to the first communication unit. Further, the network device 100 is configured to generate a trigger frame including the information for scheduling and/or configuring the first transmission and the second transmission.

By way of example, the network device 100 may be included in the first communication unit 10, or an associated controller 40 connected thereto, and the first communication unit 10 may be configured to transmit the trigger frame to the second communication unit 20.

For example, the wireless communication system may be a Wireless Local Area Network, WLAN, and the first communication unit 10 may be an access point, AP, and the second communication unit 20 may be a wireless device, STA, and the relay unit may be another wireless device, STA.

In a particular example, the network device 100 may be a cloud-based network device.

According to another aspect of the proposed technology, with reference once again to FIG. 4, there is provided a network device 200 configured to enable relayed communication in at least one direction between a first communication unit 10 and a second communication unit 20 in a wireless communication system.

The network device 200 is configured to receive a trigger frame from the first communication unit, wherein the trigger frame includes information for scheduling and/or configuring a first transmission of a data frame from the second communication unit 20 to a specified relay unit 30 and a second transmission of the data frame from the specified relay unit 30 to the first communication unit 10. The network device 200 is also configured to prepare the data frame for the first transmission of the data frame to the specified relay unit 30 according to at least part of the information included in the trigger frame.

By way of example, the network device 200 may be included in the second communication unit 20.

For example, the wireless communication system may be a Wireless Local Area Network, WLAN, and the first communication unit may be an access point, AP, and the second communication unit may be a wireless device, STA, and the relay unit may be another wireless device, STA.

According to another aspect of the proposed technology, with reference once again to FIG. 4, there is provided a relay unit 30 configured to enable relayed communication between a first communication unit 10 and a second communication unit 20 in a wireless communication system.

The relay unit 30 is configured to receive information for scheduling and/or configuring the relayed communication, wherein the information originates from a trigger frame originally transmitted by the first communication unit. The relay unit 30 is also configured to receive a data frame from the second communication unit. Further, the relay unit 30 is configured to transmit the data frame to the first communication unit according to the information for scheduling and/or configuring the relayed communication.

By way of example, the wireless communication system may be a Wireless Local Area Network, WLAN, and the first communication unit may be an access point, AP, and the second communication unit may be a wireless device, STA, and the relay unit may be another wireless device, STA.

Figure 13:
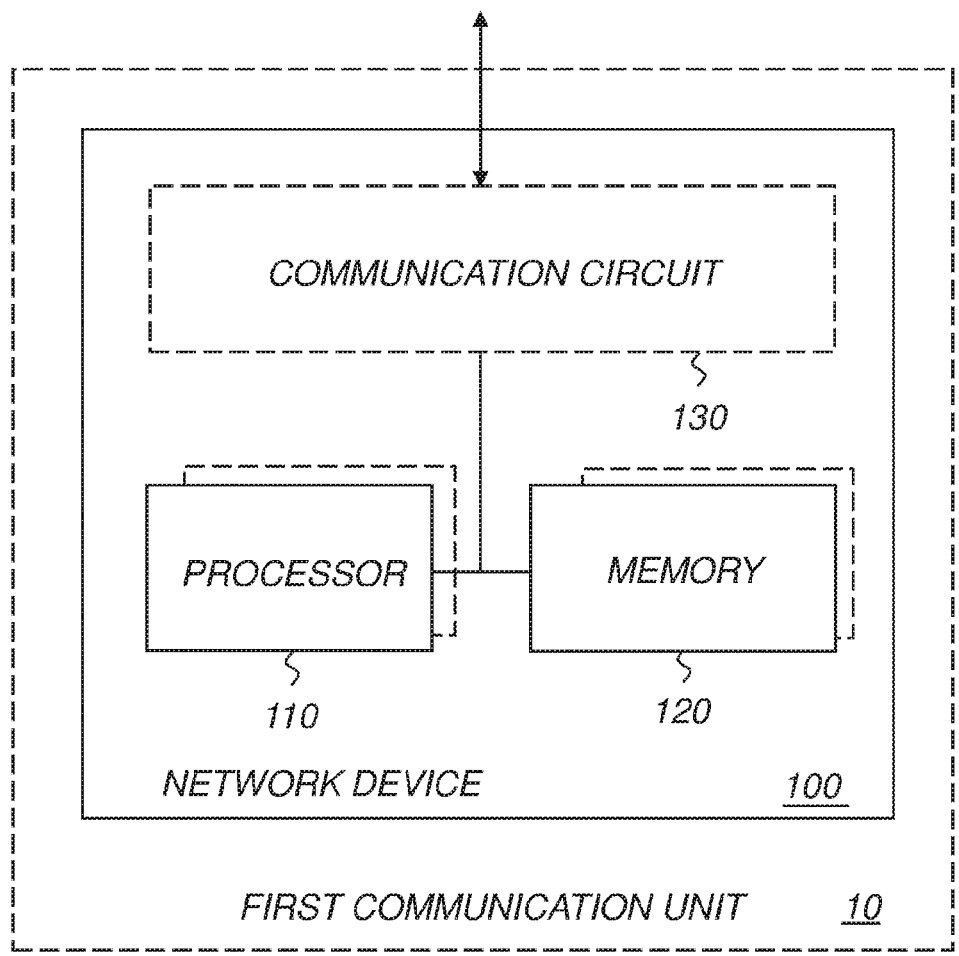
FIG. 13 is a schematic block diagram illustrating an example of a network device according to an embodiment, optionally for implementation in the first communication unit.

FIG. 13 is a schematic block diagram illustrating an example of a network device 100 according to an embodiment, optionally for implementation in the first communication unit 10. In this particular example, the network device 100 comprises at least one processor 110 and memory 120, the memory 120 comprising instructions, which when executed by the at least one processor 110, cause the at least one processor 110 to enable relayed communication. Optionally, the network device 100 may also include a communication circuit 130.

Figure 14:
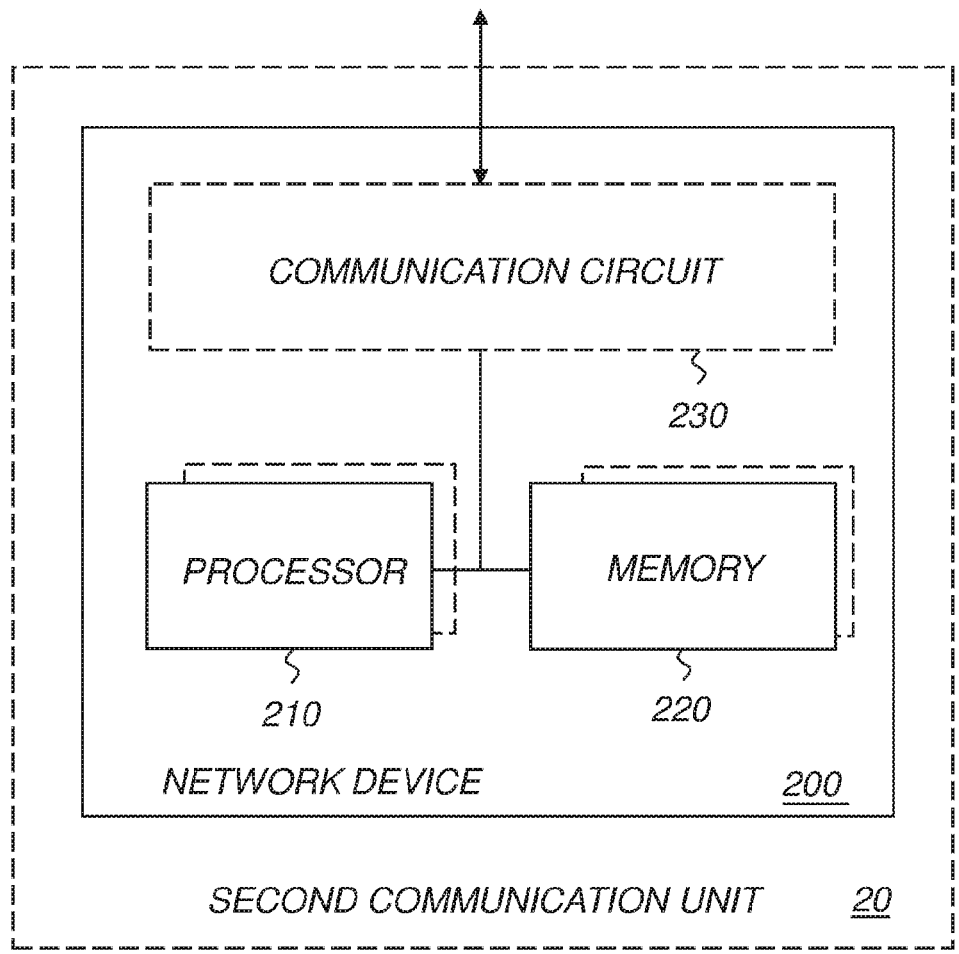
FIG. 14 is a schematic block diagram illustrating an example of another network device according to an embodiment, optionally for implementation in the second communication unit.

FIG. 14 is a schematic block diagram illustrating an example of another network device 200 according to an embodiment, optionally for implementation in the second communication unit 20. In this particular example, the network device 200 comprises at least one processor 210 and memory 220, the memory 220 comprising instructions, which when executed by the at least one processor 210, cause the at least one processor 210 to enable relayed communication. Optionally, the network device 200 may also include a communication circuit 230.

Figure 15:
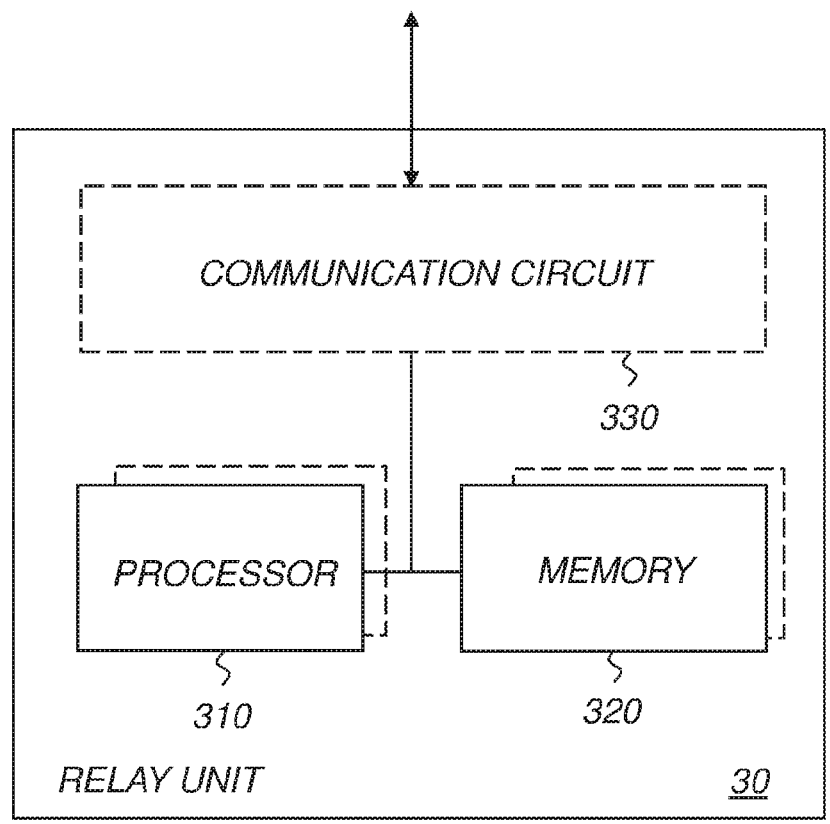
FIG. 15 is a schematic block diagram illustrating an example of a relay unit according to an embodiment.

FIG. 15 is a schematic block diagram illustrating an example of a relay unit according to an embodiment. In this particular example, the relay unit 30 comprises at least one processor 310 and memory 320, the memory 320 comprising instructions, which when executed by the at least one processor 310, cause the at least one processor 310 to enable relayed communication. Optionally, the relay unit 30 may also include a communication circuit 330.

The communication circuit 130; 230; 330 may include functions for wired and/or wireless communication with other devices and/or network nodes in the network. In a particular example, the communication circuit 130; 230; 330 may be based on radio circuitry for communication with one or more other nodes, including transmitting and/or receiving information. The communication circuit 130; 230; 330 may be interconnected to the processor and/or memory. By way of example, the communication circuit 130; 230; 330 may include any of the following: a receiver, a transmitter, a transceiver, input/output (I/O) circuitry, input port(s) and/or output port(s).

Alternatively, or as a complement, the network device(s) and/or communication unit may be based on a hardware circuitry implementation. Particular examples of suitable hardware circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM).

It is also possible to provide a solution based on a combination of hardware and software. The actual hardware-software partitioning can be decided by a system designer based on a number of factors including processing speed, cost of implementation and other requirements.

Figure 16:
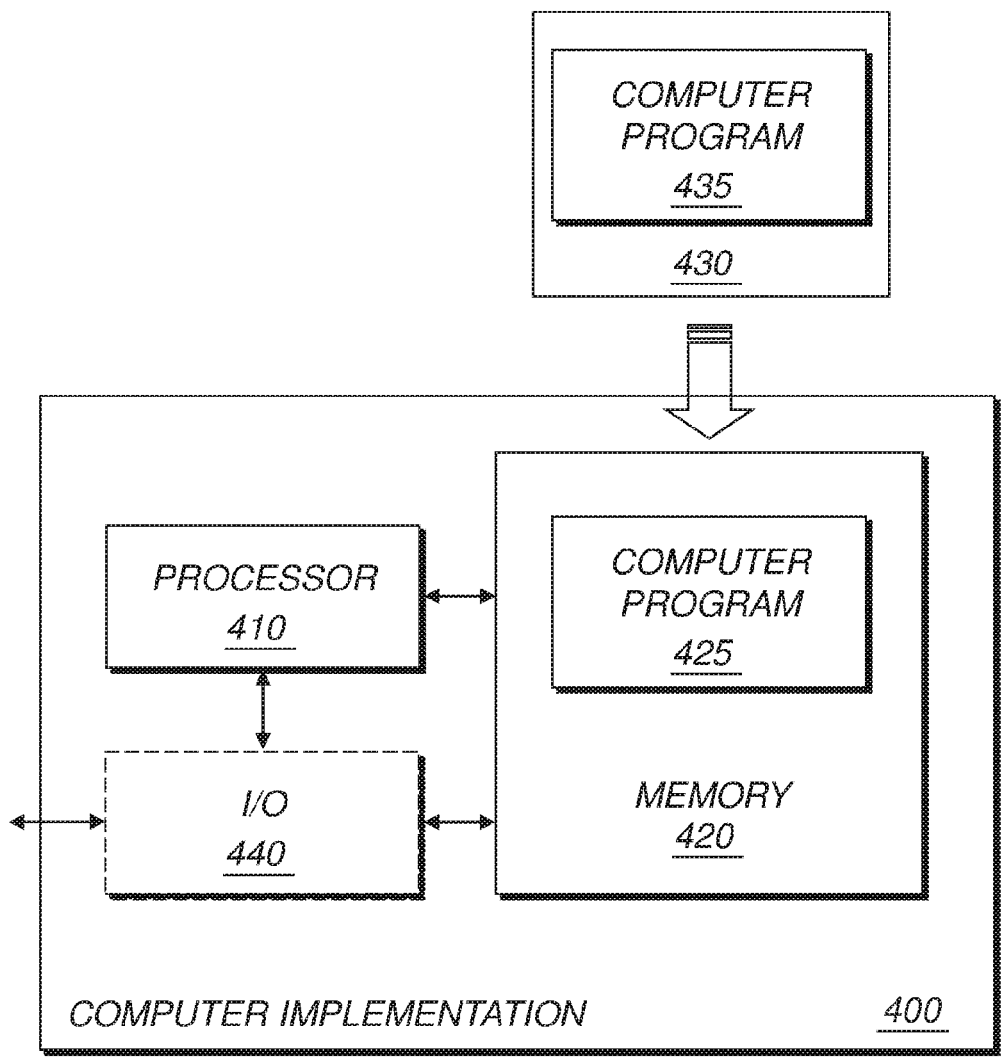
FIG. 16 is a schematic block diagram illustrating an example of a computer implementation according to an embodiment.

FIG. 16 is a schematic block diagram illustrating an example of a computer implementation 400 according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, the computer program 425; 435 is adapted for enabling, when executed, relayed communication in at least one direction between a first communication unit and a second communication unit in a wireless communication system. The computer program comprises instructions, which when executed by at least one processor 410, cause the at least one processor 410 to:
  specify a relay unit for the relayed communication;
  determine information for scheduling and/or configuring a first transmission of a data frame from the second communication unit to the specified relay unit and a second transmission of the data frame from the specified relay unit to the first communication unit; and
  generate a trigger frame including the information for scheduling and/or configuring the first transmission and the second transmission.

In another particular embodiment, the computer program 425; 435 is adapted for enabling, when executed, relayed communication in at least one direction between a first communication unit and a second communication unit in a wireless communication system, wherein the computer program comprises instructions, which when executed by at least one processor 410, cause the at least one processor 410 to:
  read a trigger frame received from the first communication unit, wherein the trigger frame includes information for scheduling and/or configuring a first transmission of a data frame from the second communication unit to a specified relay unit (30) and a second transmission of the data frame from the specified relay unit to the first communication unit; and
  prepare the data frame for the first transmission of the data frame to the specified relay unit according to at least part of the information included in the trigger frame.

In yet another particular embodiment, the computer program 425; 435 is adapted for enabling, when executed, relayed communication in at least one direction between a first communication unit and a second communication unit in a wireless communication system. The computer program comprises instructions, which when executed by at least one processor 410, cause the at least one processor 410 to:
  read information for scheduling and/or configuring the relayed communication, wherein the information originates from a trigger frame originally transmitted by the first communication unit;
  read a data frame received from the second communication unit; and
  prepare the data frame for transmission to the first communication unit according to the information for scheduling and/or configuring the relayed communication.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Hence, there is provided a computer-program product comprising a computer-readable medium 420; 430 having stored thereon a computer program 425; 435.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 17:
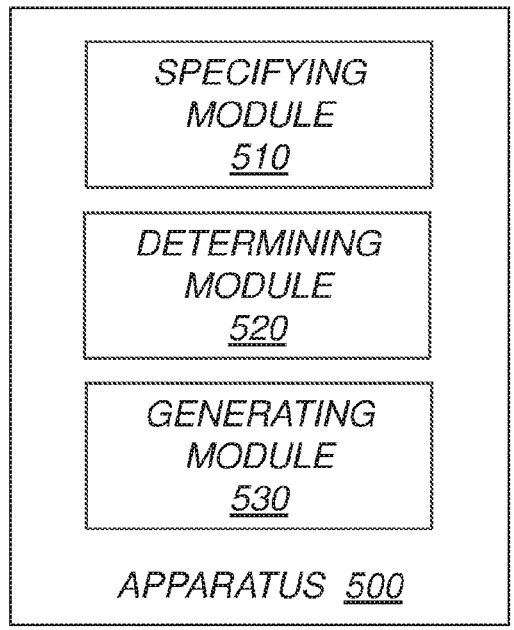
FIG. 17 is a schematic block diagram illustrating an example of an apparatus for enabling relayed communication according to an embodiment.

FIG. 17 is a schematic block diagram illustrating an example of an apparatus for enabling relayed communication in at least one direction between a first communication unit and a second communication unit in a wireless communication system. The apparatus 500 comprises:
- a specifying module 510 for specifying a relay unit for the relayed communication;
- a determining module 520 for determining information for scheduling and/or configuring a first transmission of a data frame from the second communication unit to the specified relay unit and a second transmission of the data frame from the specified relay unit to the first communication unit; and
- a generating module 530 for generating a trigger frame including the information for scheduling and/or configuring the first transmission and the second transmission.

Figure 18:
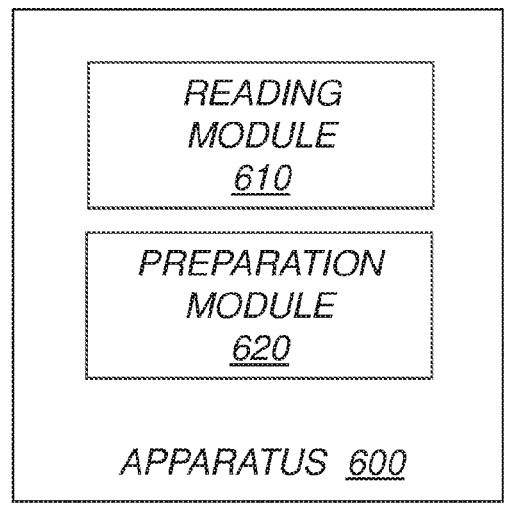
FIG. 18 is a schematic block diagram illustrating an example of an apparatus for enabling relayed communication according to another embodiment.

FIG. 18 is a schematic block diagram illustrating an example of an apparatus for enabling relayed communication in at least one direction between a first communication unit and a second communication unit in a wireless communication system. The apparatus 600 comprises:
- a reading module 610 for reading a trigger frame received from the first communication unit, wherein the trigger frame includes information for scheduling and/or configuring a first transmission of a data frame from the second communication unit to a specified relay unit and a second transmission of the data frame from the specified relay unit to the first communication unit; and
- a preparation module 620 for preparing the data frame for the first transmission of the data frame to the specified relay unit according to at least part of the information included in the trigger frame.

Figure 19:
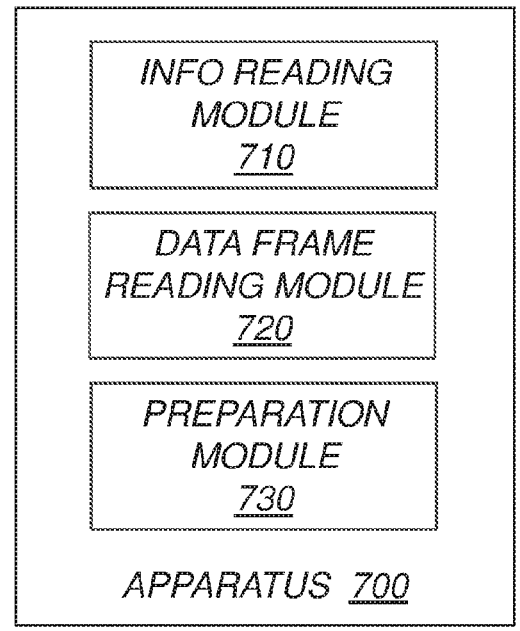
FIG. 19 is a schematic block diagram illustrating an example of an apparatus for enabling relayed communication according to yet another embodiment.

FIG. 19 is a schematic block diagram illustrating an example of an apparatus for enabling relayed communication in at least one direction between a first communication unit and a second communication unit in a wireless communication system. The apparatus 700 comprises:
- an information reading module 710 for reading information for scheduling and/or configuring the relayed communication, wherein the information originates from a trigger frame originally transmitted by the first communication unit;
- a data frame reading module 720 for reading a data frame received from the second communication unit; and
- a preparation module 730 for preparing the data frame for transmission to the first communication unit according to the information for scheduling and/or configuring the relayed communication.

Alternatively it is possible to realize the module(s) in FIGS. 17-19 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The proposed technology may also be implemented in any suitable network device in the wireless communication system, or a network device in connection with the wireless communication system. The network device or suitable parts thereof may be a cloud-implemented network device.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:
- Consolidation of network functionality into virtualized software running on customized or generic hardware. This is sometimes referred to as network function virtualization.
- Co-location of one or more application stacks, including operating system, running on separate hardware onto a single hardware platform. This is sometimes referred to as system virtualization, or platform virtualization.
- Co-location of hardware and/or software resources with the objective of using some advanced domain level scheduling and coordination technique to gain increased system resource utilization. This is sometimes referred to as resource virtualization, or centralized and coordinated resource pooling.

Although it may often be desirable to centralize functionality in so-called generic data centers, in other scenarios it may in fact be beneficial to distribute functionality over different parts of the network.

A network device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (Nis), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] IEEE P802.11ah™/D5.0. Draft Standard for Information technology—Telecommunications and information exchange between systems Local and metropolitan area networks—Specific requirements, Part 11: Wireless LAN Medium Access Control (MAC) and Physical Layer (PHY) Specifications Amendment 2: Sub 1 GHz License Exempt Operation.

The invention claimed is:

1. A method performed by a network device for enabling relayed communication in at least one direction between a first communication unit and a second communication unit in a wireless communication system, the method comprising:

the network device specifying a relay unit for the relayed communication, wherein the network device selects the relay unit from a set of relay units within communication range of the second communication unit, as experienced by the first communication unit, and wherein the network device selects the relay unit from the set of relay units based on load and/or radio conditions of the relay units;

the network device determining information for scheduling and/or configuring a first transmission of a data frame from the second communication unit to the specified relay unit and a second transmission of the data frame from the specified relay unit to the first communication unit;

the network device generating a trigger frame including the information for scheduling and/or configuring the first transmission and the second transmission, wherein the trigger frame includes information indicating a time period to perform the first transmission and/or a time period to perform the second transmission; and transmitting the trigger frame towards the second communication unit.

2. The method of claim 1, wherein the network device is included in the first communication unit, or an associated controller connected thereto, and the first communication unit transmits the trigger frame to the second communication unit.

3. The method of claim 1, wherein the network device is a cloud-based network device transferring the trigger frame to the first communication unit for subsequent transmission to the second communication unit.

4. The method of claim 2, wherein the first communication unit transmits the trigger frame in a direct transmission to the second communication unit.

5. The method of claim 1, wherein the trigger frame includes further information indicating the address of the second communication unit as well as information indicating the address of the specified relay unit as a target address of the first transmission of the data frame from the second communication unit.

6. The method of claim 1, wherein the trigger frame includes information indicating a transmission configuration for the first transmission and/or a transmission configuration for the second transmission.

7. The method of claim 6, wherein the information indicating a transmission configuration for the first transmission and/or a transmission configuration for the second transmission includes information indicating transmission duration, transmit power, modulation and coding scheme and/or radio resource allocation.

8. The method of claim 1, wherein the network device schedules the first transmission and/or the second transmission to be aggregated with at least one additional transmission.

9. The method of claim 1, wherein the wireless communication system is a Wireless Local Area Network, WLAN, and the first communication unit is an access point, AP, and the second communication unit is a wireless device, STA, and the relay unit is another wireless device, STA, and wherein the access point transmits the trigger frame in a direct downlink, DL, control transmission to the STA acting as the second communication unit to trigger an uplink, UL, relay transmission from the STA acting as the second communication unit to the access point via the STA acting as the relay unit.

10. A method performed by a network device for enabling relayed communication in at least one direction between a first communication unit and a second communication unit in a wireless communication system, the method comprising:

the network device receiving a trigger frame from the first communication unit, wherein the trigger frame includes information for scheduling and/or configuring a first transmission of a data frame from the second communication unit to a specified relay unit and a second transmission of the data frame from the specified relay unit to the first communication unit, wherein the trigger frame includes information indicating a time period to perform the first transmission and/or a time period to perform the second transmission and the relay unit is selected from a set of relay units within communication range of the second communication unit, as experienced by the first communication unit, and the relay unit is selected from the set of relay units based on load and/or radio conditions of the relay units; and the network device preparing the data frame for the first transmission of the data frame to the specified relay unit according to at least part of the information included in the trigger frame.

11. The method of claim 10, wherein the network device is included in the second communication unit, and wherein the second communication unit receives the trigger frame in a direct transmission from the first communication unit.

12. The method of claim 10, wherein the trigger frame includes information indicating the address of the specified relay unit as a target address of the first transmission of the data frame from the second communication unit and the second communication unit extracts the address of the specified relay unit.

13. The method of claim 10, wherein the network device extracts information for scheduling and/or configuring the first transmission from the trigger frame and transmits the data frame to the specified relay unit according to the extracted information for scheduling and/or configuring the first transmission.

14. The method of claim 10, wherein the network device extracts information for scheduling and/or configuring the second transmission from the trigger frame and transmits the information to the relay unit to enable scheduling and/or configuring of the second transmission of the data frame from the specified relay unit to the first communication unit.

15. A method performed by a relay unit for enabling relayed communication between a first communication unit and a second communication unit in a wireless communication system, the method comprising:

the relay unit receiving information for scheduling and/or configuring the relayed communication, wherein the information originates from a trigger frame originally transmitted by the first communication unit, wherein the trigger frame includes information indicating a time period to perform the first transmission and/or a time period to perform the second transmission, and the relay unit is selected from a set of relay units within communication range of the second communication unit, as experienced by the first communication unit, and the relay unit is selected from the set of relay units based on load and/or radio conditions of the relay units;

the relay unit receiving a data frame from the second communication unit; and the relay unit transmitting the data frame to the first communication unit according to the information for scheduling and/or configuring the relayed communication.

16. The method of claim 15, wherein the relay unit receives the trigger frame and extracts the information for scheduling and/or configuring the relayed communication from the trigger frame.

17. The method of claim 15, wherein the relay unit receives the information for scheduling and/or configuring the relayed communication via the second communication unit.

18. A network device configured to enable relayed communication in at least one direction between a first communication unit and a second communication unit in a wireless communication system, wherein the network device is configured to:

specify a relay unit for the relayed communication, wherein the network device selects the relay unit from a set of relay units within communication range of the second communication unit, as experienced by the first communication unit, and wherein the network device selects the relay unit from the set of relay units based on load and/or radio conditions of the relay units;

determine information for scheduling and/or configuring a first transmission of a data frame from the second communication unit to the specified relay unit and a second transmission of the data frame from the specified relay unit to the first communication unit;

generate a trigger frame including the information for scheduling and/or configuring the first transmission and the second transmission, wherein the trigger frame includes information indicating a time period to perform the first transmission and/or a time period to perform the second transmission; and transmit the trigger frame towards the second communication unit.

* * * * *